United States Patent [19]

Bryans

[11] 4,143,813

[45] Mar. 13, 1979

[54] AIR CONDITIONING CONTROL AND METHOD OF OPERATION

[75] Inventor: David F. Bryans, Cazenovia, N.Y.

[73] Assignee: Carrier Corporation, Syracuse, N.Y.

[21] Appl. No.: 910,808

[22] Filed: May 30, 1978

[51] Int. Cl.² .......................................... G05D 23/00
[52] U.S. Cl. ...................................... 236/51; 62/164; 307/142; 318/101
[58] Field of Search .................... 236/51; 62/231, 164; 165/22; 307/142, 140; 318/101, 51

[56] References Cited

U.S. PATENT DOCUMENTS

| | | | |
|---|---|---|---|
| 3,306,348 | 2/1967 | Tucker | 165/12 |
| 3,860,910 | 1/1975 | Hudson | 340/147 R |

Primary Examiner—William E. Wayner
Attorney, Agent, or Firm—J. Raymond Curtin; Barry E. Deutsch

[57] ABSTRACT

A control for a plurality of air conditioning units installed in separate rooms of a multi-room building, with each air conditioning unit having an on-off switch to selectively connect the air conditioning unit to a source of electrical power. The control includes a switch for simultaneously interrupting the electrical power supplied to each air conditioning unit to place each unit in an off state. Once the supply of electrical power to each unit is renewed, each unit is prevented from restarting until the unit's on-off switch has been manually moved from its on position to its off position.

5 Claims, 1 Drawing Figure

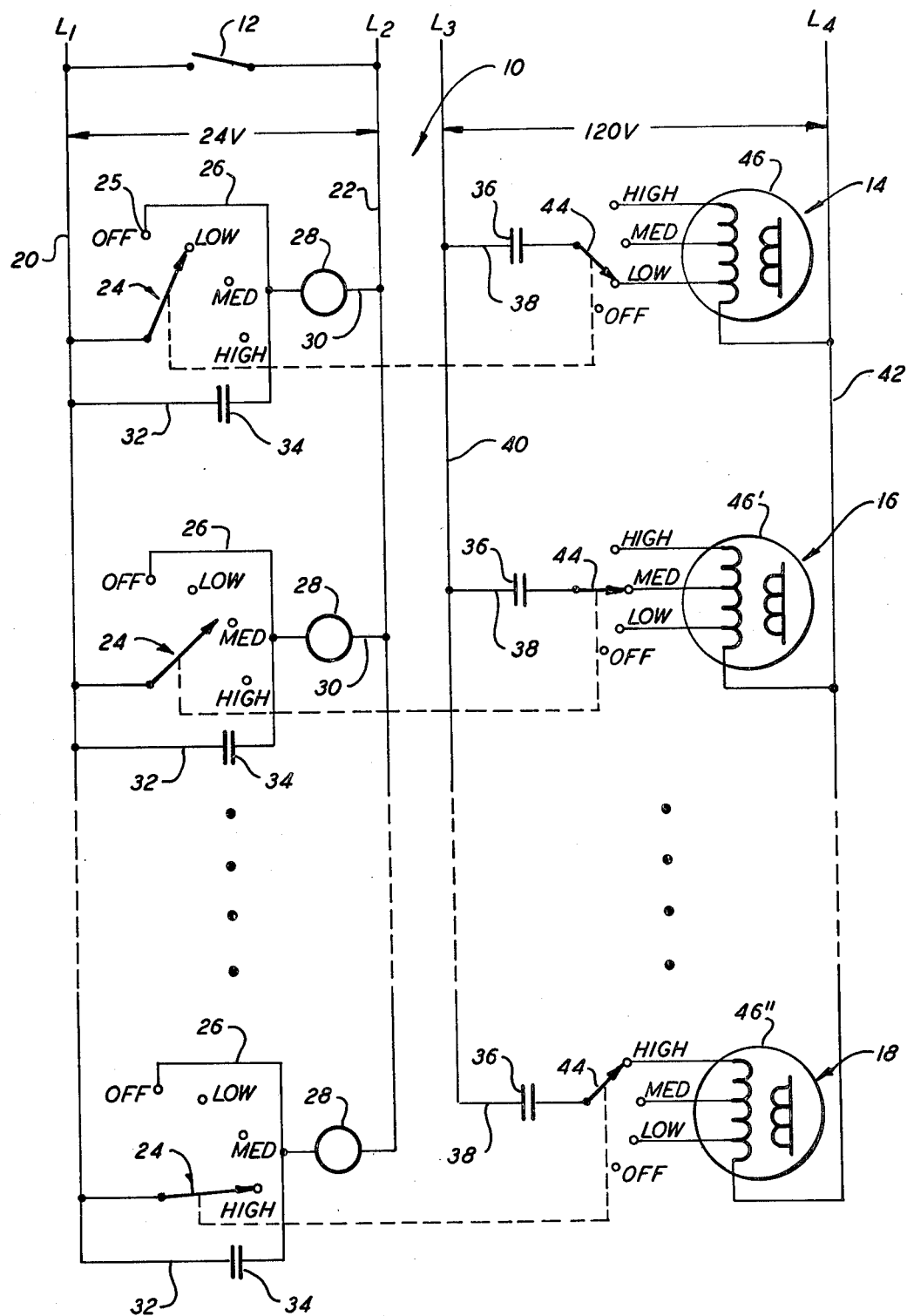

AIR CONDITIONING CONTROL AND METHOD OF OPERATION

BACKGROUND OF THE INVENTION

This invention relates to a control for a plurality of air conditioning units installed in separate rooms of a multi-room building, and in particular, to a control specifically designed to prevent such units from continuing to operate over prolonged periods of time when the rooms are not occupied.

The recent energy shortage and increased energy costs has resulted in a new awareness that power consuming apparatus should only be operated when actually needed. That is to say, continuous operation of power consuming apparatus under conditions not actually requiring such operation, not only wastes energy but also results in unwarranted operating costs for such apparatus. For example, in multi-room buildings such as hotels and motels, wherein each room has its own air conditioning unit, the operation of any one air conditioning unit is only required when the room served by such one unit is occupied. When the room is not occupied, continuous operation of the air conditioning unit results in an undesired wastage of energy.

As used herein, the term air conditioning unit encompasses various types of air conditioning apparatus, utilizing electrically operated components. For example, the typical room air conditioning unit employs a mechanically operated refrigeration unit utilizing an electrically operated compressor motor and one or more fan motors. A fan coil unit includes an evaporator coil installed in the room and has an electrically operated fan to route room air thereover. Other similar types of electrically operated air conditioning units shall be included within the scope of the present invention.

An example of a prior patent which recognizes the same problem as that described hereinabove is disclosed in U.S. Pat. No. 4,060,123. In this patent, the occupancy status of each room is detected by suitable detector means, with the air conditioning unit being rendered inoperable when the room is unoccupied and automatically rendered operable when the room is occupied.

The energy saving control disclosed in the aforecited United States Patent is relatively complex when compared to the present invention.

SUMMARY OF THE INVENTION

It is accordingly an object of this invention to control the operation of a plurality of air conditioning units provided in a multi-room building.

It is a further object of this invention to control such air conditioning units to reduce their use of energy and to lower their operating cost.

It is a further object of this invention to periodically discontinue operation of all the air conditioning units provided in a multi-room building.

It is a further object of this invention to require an occupant of a room to manually move a switch to permit renewed operation of an air conditioning unit once such unit has been rendered inoperable from a central control station.

These and other objects of the present invention are attained in a control for a plurality of air conditioning units installed in separate rooms of a multi-room building, with each unit having an on-off switch to selectively connect the unit to a source of electrical power. The control includes means to simultaneously interrupt the electrical power supplied to each air conditioning unit, to place each unit in an off state. The air conditioning unit is prevented from restarting even though the supply of electrical power has been renewed until that unit's on-off switch has been manually moved from its on position to its off position.

BRIEF DESCRIPTION OF THE DRAWING

The single FIGURE of the drawing schematically illustrates a plurality of air conditioning units embodying the present invention.

DESCRIPTION OF THE PREFERRED EMBODIMENT

Referring now to the single FIGURE of the drawing, there is disclosed a preferred embodiment of the present invention. The control 10 for air conditioning units 14, 16 and 18 includes a switch 12 provided at a single control station to selectively terminate the flow of electrical power through lines 20 and 22 from an electrical power source represented by L1 and L2.

An on-off switch 24 for each air conditioning unit is connected to the source of electrical power delivered through lines 20 and 22. Switch 24 is movable between an off position and a plurality of "on" positions, with each on position corresponding to a high, medium, or low speed position for regulating the operating speed of any one air conditioning unit.

A conductor 26 connects the off terminal 25 of switch 24 with a relay 28. Relay 28 controls the energization of a first normally open switch 34 and a second normally open switch 36. Normally open switch 34 is provided in electrical conductor 32. Electrical conductor 30 connects relay 28 to line 22.

The electrical components heretofore described are associated with an air conditioning unit 14. Air conditioning unit 14 includes an electrically operated motor 46 which may drive a fan or a compressor or other suitable components of an air conditioning unit. Each air conditioning unit includes a switch 44 movable between an off position and high, medium and low speed run positions. Switch 44 is mechanically connected to switch 24 so that movement of switch 24 places switch 44 in a corresponding position. For example, when switch 24 is in its off position, switch 44 is similarly in an off position, and when switch 24 is in its high speed operating position switch 44 is likewise in its high speed operating position. Electrical motor 46 will operate at the particular speed as established by the position of switch 44. Electrical power is delivered to air conditioning unit 14 thru electrical conductors 40 and 42 from a suitable source of electricity represented by L3 and L4. Electrical conductor 38 including normally open switch 36, delivers electrical power from conductor 40 to speed selector switch 44.

As previously indicated, the present invention relates to a control for a plurality of air conditioning units installed in separate rooms of a multi-room building. Thus, for example, air conditioning units 14, 16 and 18 are installed in three separate rooms of a building. Each air conditioning unit has an on-off switch 24, a speed selector switch 44 and an electrical motor 46, as well as the other electrical components heretofore described.

In operation, the control of the present air conditioning unit is designed to conserve energy by rendering air conditioning units in an unoccupied space inoperable.

Let us first assume that it is desired to permit operation of each air conditioning unit. Accordingly switch 12 is closed. Switch 24 is initially placed in its off position thereby energizing relay 28. The energization of relay 28 results in the closure of switches 34 and 36. The closure of switch 34 establishes a holding circuit to maintain relay 28 energized even though switch 24 is moved from its off position to one of its "on" positions. With switch 36 closed, the air conditioning unit is connected to the source of power L3 and L4 once speed selector switch 44 is moved from its off position to the particular speed of operation desired, as for example the low speed mode shown in relation to air conditioning unit 14, or the medium speed mode shown with respect to air conditioning unit 16 or the high speed mode of operation shown with respect to air conditioning unit 18. As switches 24 and 44 are mechanically attached, switch 24 moves from its off position to an "on" position corresponding to the run position to which switch 44 has been moved.

To conserve energy, switch 12 is periodically opened to discontinue the supply of electrical power through conductors 20 and 22. When switch 12 is opened, relay 28 is de-energized. This results in the opening of switches 34 and 36. With switch 36 open, the air conditioning unit is stopped and cannot be restarted until switch 36 closes to reconnect the air conditioning unit to the source of electrical power through conductors 40 and 42. Switch 36 will remain open until on-off switch 24 is returned to its off position whereby the switch contacts terminal 25. With switch 24 in its off position, relay 28 is again energized. Until switch 24 is manually moved to its off position from an on position, relay 28 will remain de-energized irrespective of the renewed supply of electrical energy resulting from the reclosing of switch 12.

The individual air conditioning units cannot be restarted until the following sequence of events occur: switch 24 must be manually moved from one of its "on" positions to its off position to permit re-energization of relay 28. So long as switch 24 is in one of its on positions, relay 28 cannot be re-energized even though the switch 12 is closed to renew the supply of electricity thru conductors 20 and 22. Thus, the air conditioning units will remain inoperative until switch 24 is manually moved from an on position to its off position. As is obvious, the manual movement of switch 24 to permit renewed operation of an air conditioning unit will only occur when a particular room is occupied. Once switch 24 is returned to its off position, relay 28 will again be energized to reclose switches 34 and 36 to permit the air conditioning units to once again operate. As is obvious, suitable thermostats may be provided in association with each air conditioning unit to discontinue operation of any one individual air conditioning unit when a particular cooling or heating load in an occupied space is satisfied. The control herein described will conserve energy and reduce operating costs of an air conditioning unit by preventing such unit from continuously operating when the room served by the unit is unoccupied.

While a preferred embodiment of the present invention has been described and illustrated, the invention should not be limited thereto but may be otherwise embodied within the scope of the following claims.

What is claimed is:

1. A method of controlling the operation of a plurality of air conditioning units, installed in separate rooms of a multi-room building, with each unit having its own on-off switch to selectively connect the unit to a source of electrical power, comprising the steps of:
   simultaneously interrupting the electrical power supplied to each air conditioning unit to place each unit in an off state;
   renewing the supply of electrical power to each unit; and
   preventing the restarting of any one unit once the supply of electrical power has been renewed until the unit's on-off switch has been manually moved from its on position to its off position.

2. A control for a plurality of air conditioning units installed in separate rooms of a multi-room building, with each unit having an on-off switch to selectively connect the unit to a source of electrical power, said control comprising;
   electrical power interrupting means to simultaneously discontinue the supply of electrical power to each air conditioning unit to place each unit in an off state; and
   means connected to said on-off switch to prevent the restarting of any one unit once the supply of electrical power has been renewed until the on-off switch has been placed in its off position.

3. A control in accordance with claim 2 wherein said restart preventing means includes a relay electrically connected to said on-off switch, said relay being energized when the switch is placed in its off position;
   a holding circuit energized in response to energization of said relay to maintain said relay energized after the switch is moved to its on position; and
   a normally open switch in series with said air conditioning unit, the closure of said switch in response to energization of said relay connecting said air conditioning unit to said source of electrical power.

4. A control in accordance with claim 3 wherein said relay is de-energized upon the interruption of said electrical power, said relay remaining de-energized until said on-off switch is placed in its off position, irrespective of the renewed supply of electrical power.

5. A control in accordance with claims 2 or 4 further including a multi-position speed selector switch to select the operating speed for said air conditioning unit, said speed selector switch being connected to said on-off switch, movement of said speed selector switch to one of its operating speed positions resulting in corresponding movement of said on-off switch to an on position.

* * * * *